(12) United States Patent
Balakrishnan et al.

(10) Patent No.: US 11,197,042 B2
(45) Date of Patent: Dec. 7, 2021

(54) DISTRIBUTED 3D VIDEO FOR NAVIGATION

(71) Applicant: Intel Corporation, Santa Clara, CA (US)

(72) Inventors: Ravikumar Balakrishnan, Hillsboro, OR (US); Venkatesan Nallampatti Ekambaram, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 133 days.

(21) Appl. No.: 15/849,136

(22) Filed: Dec. 20, 2017

(65) Prior Publication Data

US 2019/0045244 A1  Feb. 7, 2019

(51) Int. Cl.
| | |
|---|---|
| H04N 21/236 | (2011.01) |
| H04N 5/247 | (2006.01) |
| G08G 1/16 | (2006.01) |
| H04N 21/2187 | (2011.01) |
| H04N 21/218 | (2011.01) |
| H04N 21/2743 | (2011.01) |
| H04N 21/414 | (2011.01) |
| H04N 13/194 | (2018.01) |

(52) U.S. Cl.
CPC ....... *H04N 21/23605* (2013.01); *G08G 1/162* (2013.01); *G08G 1/163* (2013.01); *H04N 5/247* (2013.01); *H04N 13/194* (2018.05); *H04N 21/2187* (2013.01); *H04N 21/21805* (2013.01); *H04N 21/2743* (2013.01); *H04N 21/41422* (2013.01)

(58) Field of Classification Search
CPC .......... H04N 21/23605; H04N 13/194; H04N 5/247; H04N 21/2187; H04N 21/21805; H04N 21/2743; H04N 21/41422; G08G 1/162; G08G 1/163
See application file for complete search history.

(56) References Cited

U.S. PATENT DOCUMENTS

| | | | |
|---|---|---|---|
| 2016/0277911 A1* | 9/2016 | Kang | H04W 4/90 |
| 2016/0357188 A1* | 12/2016 | Ansari | G05D 1/0212 |
| 2018/0075746 A1* | 3/2018 | Jiang | G08G 1/096791 |
| 2018/0224846 A1* | 8/2018 | Kovacs | G08G 1/0112 |
| 2018/0234913 A1* | 8/2018 | Kahtava | H04W 8/005 |
| 2019/0161085 A1* | 5/2019 | Dudar | B60W 30/18009 |
| 2019/0276022 A1* | 9/2019 | Bae | B60W 10/04 |

OTHER PUBLICATIONS

Grassi et al., "VANET via Named Data Networking," 2014. (Year: 2014).*
Grassi e al., "Vehicular Inter-Networking via Named Data," Oct. 22, 2013. (Year: 2013).*
Wang et al., "Data Naming in Vehicle-to-Vehicle Communications" (Year: 2012).*

(Continued)

*Primary Examiner* — Michael J Hess
(74) *Attorney, Agent, or Firm* — Jordan IP Law, LLC

(57) ABSTRACT

An embodiment of a semiconductor package apparatus may include technology to request video information from a source outside of a vehicle, receive the video information in response to the request, and construct 3D video information for the vehicle based on the received video information. Other embodiments are disclosed and claimed.

23 Claims, 10 Drawing Sheets

(56) References Cited

OTHER PUBLICATIONS

Yan et al., "A Novel Vehicular Information Network Architecture Based on Named Data Networking (NDN)," IEEE Internet of Things Journal, vol. 1, No. 6, Dec. 2014 (Year: 2014).*
Biswas et al., Vehicle-to-Vehicle Wireless Communication Protocols for Enhancing Highway Traffic Safety, IEEE Communications Magazine, Jan. 2006 (Year: 2006).*
Ding et al., "Real-time vehicle route guidance using vehicle-to-vehicle communication," Special Issue on Vehicular Ad Hoc and Sensor Networks, IET Commun., vol. 4, Iss. 7, pp. 870-883, 2010 (Year: 2010).*
Maskulainen et al., "Performance Evaluation of Adaptive Beamforming in 5G-V2X Networks," IEEE 2017 (Year: 2017).*
"Intelligent Transport Systems (ITS); Radiocommunications equipment operating in the 5 855 MHz to 5 925 MHz frequency band; Harmonised Standard covering the essential requirements of article 3.2 of Directive 2014/53/EU", retrieved from etsi.org/deliver/etsi_en/302500_302599/302571/02.00.00_20/en_302571v020000a.pdf, Mar. 2016, 45 pages.
"Intelligent Transport Systems (ITS); Vehicular communications; Basic set of applications; Part 2: Specification of cooperative awareness basic service", retrieved from etsi.org/deliver/etsi_en/302600_302699/30263702/01.03.02_60/en_30263702v010302p.pdf, Nov. 2014, 44 pages.
"Intelligent Transport System (ITS); Vehicular communications; Basic set of applications; Part 3: Specifications of decentralized environmental notification basic service", retrieved from etsi.org/deliver/etsi_en/302600_302699/30263703/01.02.02_60/en_30263703v010202p.pdf, Nov. 2014, 73 pages.
Wikipedia, "IEEE 802.11P", retrieved from en.wikipedia.org/wiki/IEEE_802.11p, retrieved on Oct. 23, 2017, 4 pages.
"Release 14", retrieved from 3gpp.org/release-14, retrieved on Oct. 23, 2017, 2 pages.
Intelligent Transport Systems (ITS); Vehicular communications; Basic set of applications; Local Dynamic Map (LDM), retrieved from etsi.org/deliver/etsi_tr/102800_102899/102863/01.01.01_60/tr_102863v010101p.pdf, Jun. 2011, 40 pages.

* cited by examiner

44 ⭢

50 ⭢

DISTRIBUTED 3D VIDEO FOR NAVIGATION

TECHNICAL FIELD

Embodiments generally relate to vehicle navigation. More particularly, embodiments relate to distributed three-dimensional (3D) video for navigation.

BACKGROUND

An autonomous or semi-autonomous vehicle (AV) may include various technologies for perception, such as camera feeds and sensory information. The European Technology Standards Institute (ETSI) publishes an Intelligent Transport Systems (ITS) standard which includes telematics and various types of communications in vehicles, between vehicles (e.g., car-to-car), and between vehicles and fixed locations (e.g., car-to-infrastructure). Dedicated short-range communications (DSRC) may provide communications between the vehicle and the roadside in specific locations (e.g., toll plazas for applications such as electronic fee collection). Cooperative-ITS (C-ITS) may support full autonomous driving including wireless short range communications (ITS-G5) dedicated to automotive ITS and road transport and traffic telematics (RTTT). C-ITS may provide connectivity between road participants and infrastructure.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
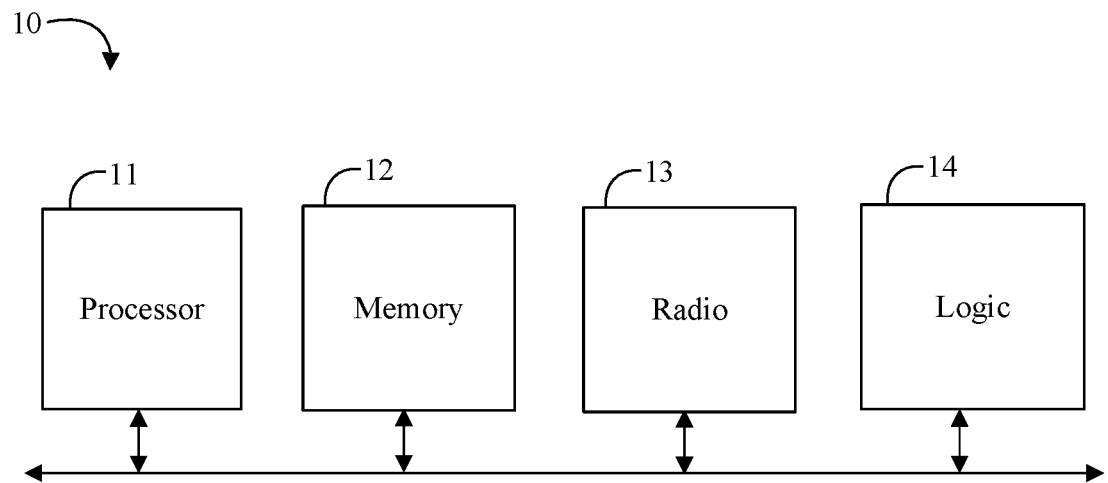
FIG. 1A is a block diagram of an example of an electronic processing system according to an embodiment.

Turning now to FIG. 1A, an embodiment of an electronic processing system 10 may include a processor 11, memory 12 communicatively coupled to the processor 11, a radio 13 communicatively coupled to the processor 11, and logic 14 communicatively coupled to the processor 11 and the radio 13 to request video information from a source outside of a vehicle, receive the video information in response to the request, and construct 3D video information for the vehicle based on the received video information. When video information is requested from a vehicle, for example, the vehicle may either send the raw video feeds it has through that instant or a compressed and reconstructed video depending on the request type and available bandwidth. In some embodiments, the system 10 may be located inside a vehicle and may be part of or integrated with a vehicle computer system. For example, the source outside the vehicle may include one or more other vehicles, one or more cloud services, etc. The 3D video information may be useful for constructing models for maps (e.g., two-dimensional (2D) and/or 3D models). For example, the 3D video information may be useful for navigation and the vehicle(s) may include one or more AVs (as used herein, 'autonomous' may refer to either fully autonomous or partially autonomous). Although discussed primarily with the example applicable of autonomous vehicles, some embodiments may be adapted for non-autonomous vehicles or other video applications such as augmented reality (AR) and/or merged reality (MR) (e.g., where another type of edge device may be substituted for the vehicle).

In some embodiments, the logic 14 may be configured to send an interest packet to one or more other vehicles to indicate an interest in video information from the one or more other vehicles. For example, the logic 14 may also be configured to communicate partial video information between the vehicle and the one or more other vehicles with a content-addressable message, and/or to beamform a message to direct the interest packet to the one or more other vehicles. Beamforming may transmit the content-addressable interest packet in the direction of interest. Advantageously, beamforming techniques may be efficient because the sender may determine which field-of-view video is needed and based on that may determine the beamforming parameters and send the interest packet only to that location. Any AV that is present in that location may have a higher chance of having the field-of-view needed, so those AVs can respond with a corresponding data packet in return.

In some embodiments, the logic 14 may be further configured to buffer interest packet requests, and send a video data response packet over a content-centric and content-addressable network. In another embodiment, the receiving AV may buffer interest packet requests and forward the request with the same beamforming parameters if the receiving AV does not have the matching data requested in the interest packet. For example, the logic 14 may also be configured to exchange camera parameter information between the vehicle and the one or more other vehicles, and perform content-based addressing based on the exchanged camera parameters. In some embodiments, the logic 14 may also add signature information to the video data response packet, and/or add nonce information to the interest packet.

Embodiments of each of the above processor 11, memory 12, radio 13, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 14, requesting video information from a source outside of a vehicle, receiving the video information in response to the request, constructing 3D video information for the vehicle based on the received video information, etc.).

Figure 1B:
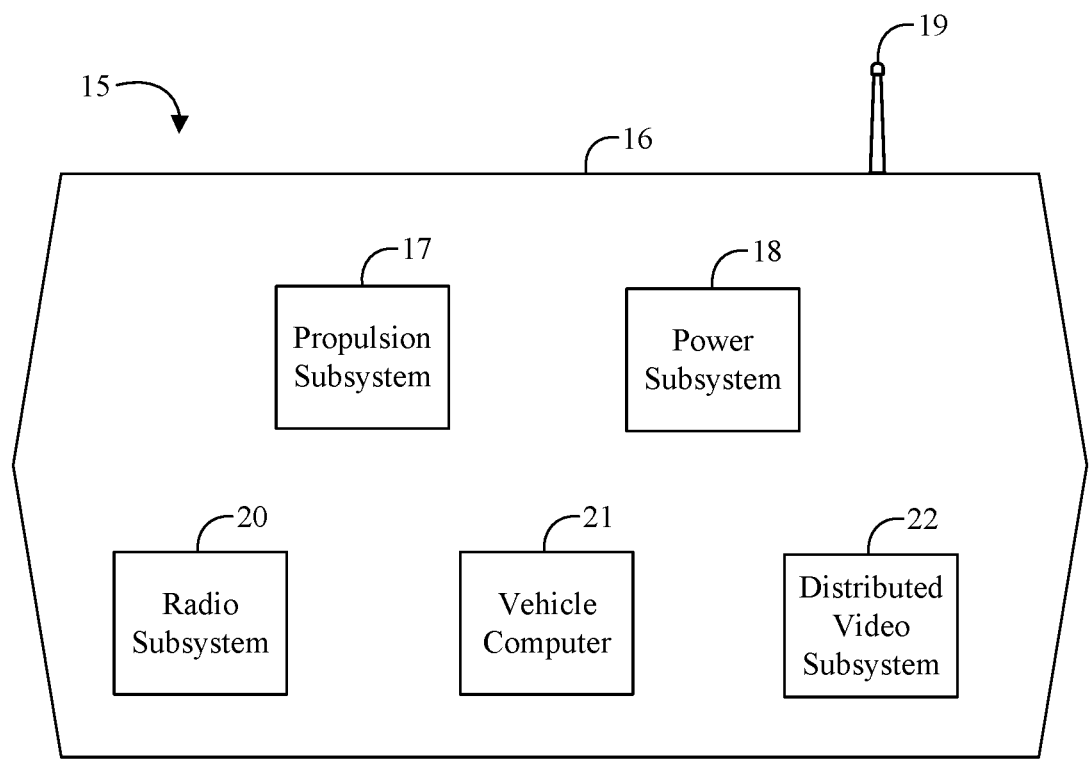
FIG. 1B is a block diagram of an example of an autonomous vehicle according to an embodiment.

Turning now to FIG. 1B, an embodiment of an autonomous vehicle (AV) 15 may include a vehicle body 16 housing/supporting a propulsion subsystem 17 and a power subsystem 18. The AV 15 may be fully autonomous or semi-autonomous and may optionally accommodate one or more passengers and/or one or more drivers/pilots. The propulsion subsystem 17 may include one or more of ground propulsion components, air propulsion components, marine propulsion components, and space propulsion components, or any other suitable propulsion components (e.g., cable, maglev, etc.). For example, the AV 15 may be a car, a plane, a helicopter, a boat, a drone, etc. The power subsystem 18 may include one or more batteries or electrical power sources. In some embodiments, the power subsystem may optionally include one or more additional power sources such as a gasoline or other fuel powered engine. The AV 15 may also include one or more antennas 19 coupled a radio subsystem 20, a vehicle computer 21, and a distributed video subsystem 22. The components and subsystems of the AV 15 may be coupled to each in any suitable manner, including mechanically and/or electrically. Electrical components may be communicatively coupled to each other wired or wirelessly.

The distributed video subsystem 22 may be configured as described in connection with the system 10 above (e.g., and/or may include features of the other embodiments described below). In particular, the distributed video subsystem 22 may include technology to request video information from a source outside of the AV 15, receive the video information in response to the request, and construct 3D video information for the AV 15 based on the received video information. In some embodiments, the distributed video subsystem 22 may be configured to cause the radio subsystem 20 to send an interest packet to one or more other vehicles to indicate an interest in video information from the one or more other vehicles. For example, the distributed video subsystem 22 may also be configured to cause the radio subsystem 20 to communicate partial video information between the AV 15 and the one or more other vehicles with a content-addressable message, and/or to beamform a message to direct the interest packet to the one or more other vehicles (e.g., direct the interest packet towards the field-of-view of interest).

In some embodiments, the distributed video subsystem 22 may be further configured to buffer interest packet requests, and to cause the radio subsystem 20 to send a video data response packet over a content-centric and content-addressable network. For example, the distributed video subsystem 22 may also be configured to exchange camera parameter information between the vehicle and the one or more other vehicles, and perform content-based addressing based on the exchanged camera parameters. In some embodiments, the distributed video subsystem 22 may also add signature information to the video data response packet, and/or add nonce information to the interest packet. In some embodiments, the distributed video subsystem 22 may be physically or logically arranged as a module outside of the vehicle computer 21. Alternatively, in some embodiments all or portions of the distributed video subsystem 22 may be implemented in or integrated with the vehicle computer 21.

Figure 2:
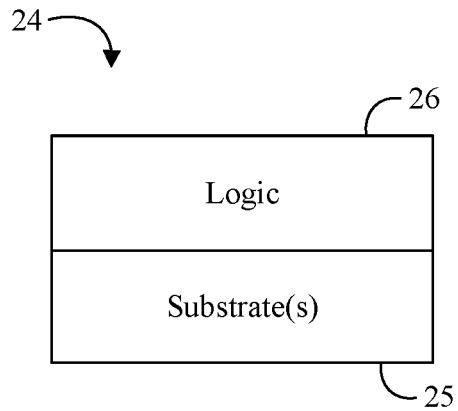
FIG. 2 is a block diagram of an example of a semiconductor package apparatus according to an embodiment.

Turning now to FIG. 2, an embodiment of a semiconductor package apparatus 24 may include one or more substrates 25, and logic 26 coupled to the one or more substrates 25, wherein the logic 26 is at least partly implemented in one or more of configurable logic and fixed-functionality hardware logic. The logic 26 coupled to the one or more substrates 25 may be configured to request video information from a source outside of a vehicle, receive the video information in response to the request, and construct 3D video information for the vehicle based on the received video information. In some embodiments, the logic 26 may be configured to send an interest packet to one or more other vehicles to indicate an interest in video information from the one or more other vehicles. For example, the logic 26 may also be configured to communicate partial video information between the vehicle and the one or more other vehicles with a content-addressable message, and/or to beamform a message to direct the interest packet to the one or more other vehicles (e.g., direct the interest packet towards the field-of-view of interest). In some embodiments, the logic 26 may be further configured to buffer interest packet requests, and send a video data response packet over a content-centric and content-addressable network. For example, the logic 26 may also be configured to exchange camera parameter information between the vehicle and the one or more other vehicles, and perform content-based addressing based on the exchanged camera parameters. In some embodiments, the logic 26 may also add signature information to the video data response packet, and/or add nonce information to the interest packet.

Embodiments of logic 26, and other components of the apparatus 24, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
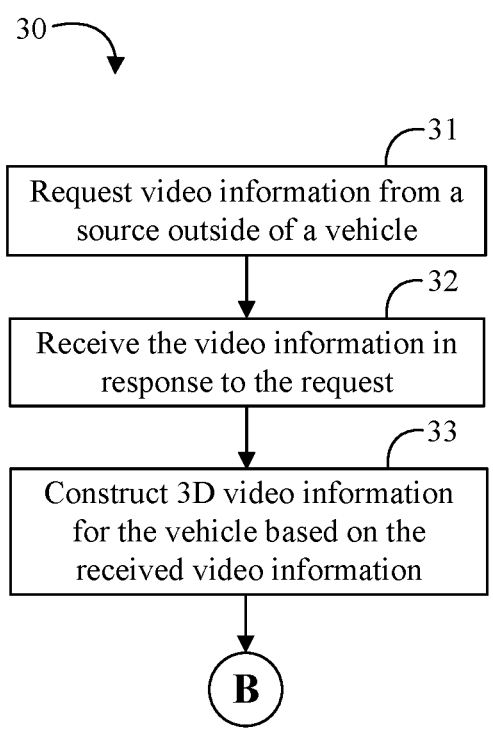
FIGS. 3A to 3C are flowcharts of an example of a method of distributing video information according to an embodiment.
Figures 3B, 3C:
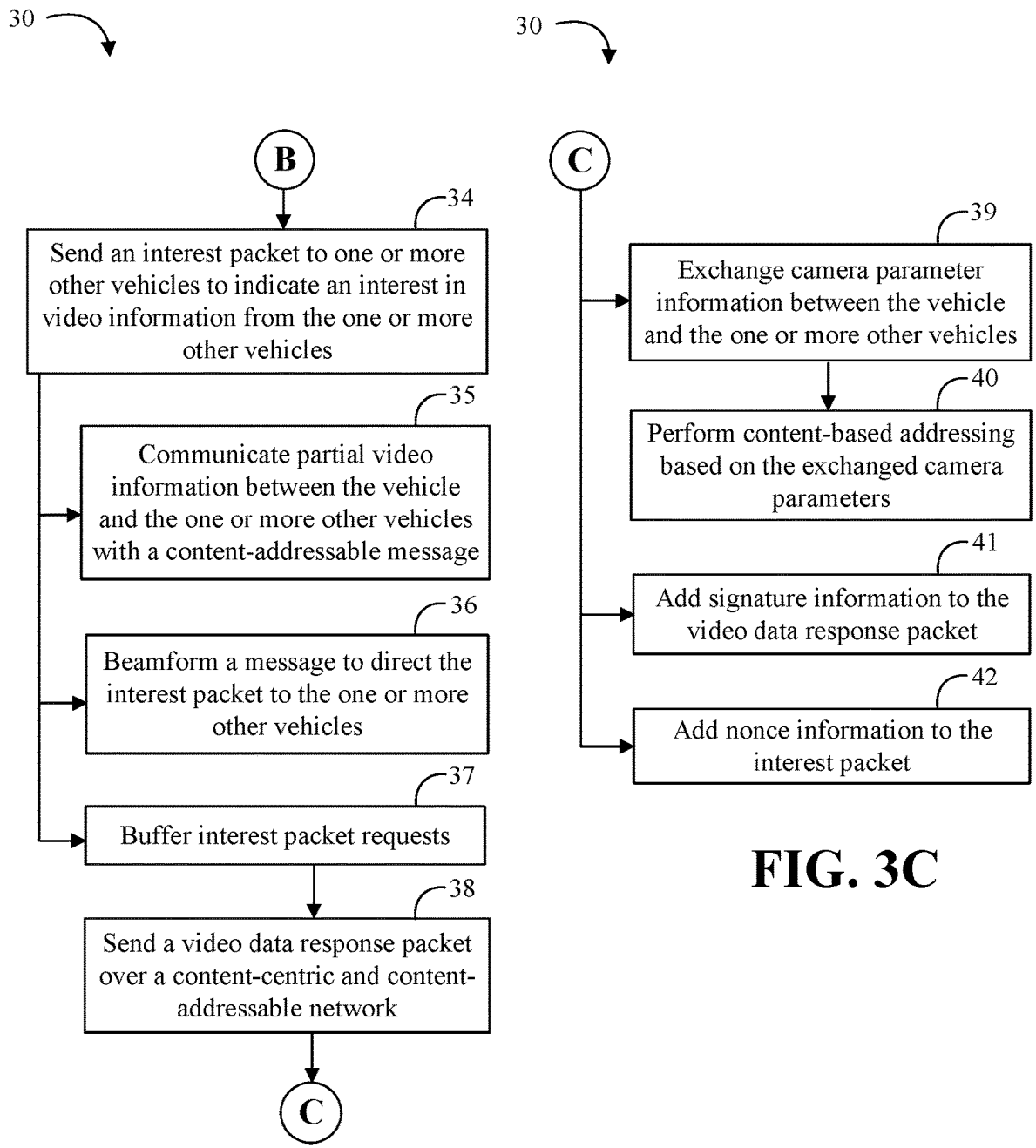

Turning now to FIGS. 3A to 3C, an embodiment of a method 30 of distributing video information may include requesting video information from a source outside of a vehicle at block 31, receiving the video information in response to the request at block 32, and constructing 3D video information for the vehicle based on the received video information at block 33. Some embodiments of the method 30 may include sending an interest packet to one or more other vehicles to indicate an interest in video information from the one or more other vehicles at block 34. For example, the method 30 may also include communicating partial video information between the vehicle and the one or more other vehicles with a content-addressable message at block 35, and/or beamforming a message to direct the interest packet to the one or more other vehicles at block 36. Some embodiments of the method 30 may also include buffering interest packet requests at block 37, and sending a video data response packet over a content-centric and content-addressable network at block 38. For example, the method 30 may also include exchanging camera parameter information between the vehicle and the one or more other vehicles at block 39, and performing content-based addressing based on the exchanged camera parameters at block 40. Some embodiments of the method 30 may further include adding signature information to the video data response packet at block 41, and/or adding nonce information to the interest packet at block 42.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 27 below. Embodiments or portions of the method 30 may be implemented in firmware, applications (e.g., through an application programming interface (API)), or driver software running on an operating system (OS).

Some embodiments may advantageously provide a distributed 3D video model for navigation using a location and content-centric wireless network architecture. Autonomous navigation may help enable fully or semi-autonomous vehicles. AVs may include a variety of sensors configured to help achieve autonomy. Cameras fitted in an AV may capture local visual information data used to detect obstacles and provide context awareness for autonomous navigation. Such visual data from multiple cars may be combined together to provide enhanced perception.

Advantageously, some embodiments may provide the generation of a 3D real-time video of a given location at a given point in time. For example, such a video stream may be useful for enhanced perception for autonomous driving where a vehicle may obtain a 3D video of not only its adjacent locations, but also relatively far off locations which may be used for path planning and obstacle avoidance. An enhanced 3D video of the entire lane, for example, may provide non-line-of-sight perception to the vehicles as well. For example, a car may be able to know about obstacles and vehicles behind a truck that's obstructing camera views from its own sensors. The car may be able to get the depth, velocity and dimensions of all obstacles and vehicles down a path. In the physical world, a vehicle may be traversing a 3D environment along with other vehicles. Some embodiments may advantageously improve autonomous driving by constructing a 3D video/model/map that may provide the vehicle with more knowledge of events in the environment, including predictions of how the environment may evolve over time.

Generating a 3D video may benefit from multiple camera views of the scene at different angles. Cameras on a single vehicle may only provide information about its local views. With a suitably equipped AV and vehicle-to-vehicle (V2V) communication, precise location of vehicles and other parameters may be determined and exchanged between vehicles. Because the location of the cameras on the vehicle and other parameters may be calibrated in advance, some embodiments may advantageously integrate the video information from all available cameras to generate a more complete 3D navigation video/model for each AV. In some embodiments, the 3D navigation models generated from the distributed video sources may provide an extended vision to each AV because the AV may obtain the video information down the lane beyond the range of its own cameras. Such extended vision may help in autonomous navigation where the AV may have enhanced contextual and visual information of the scene looking forward. For example, the AV may make decisions in terms of the route to take, lane changes to be made, etc. based on such enhanced contextual information.

For such video generation, relevant video information may be exchanged between the AVs. For example, precise camera parameters (e.g., including intrinsic parameters, orientation, position, etc.), vehicle location, and the captured video segments may be exchanged between the vehicles. Advantageously, some embodiments may provide a location and/or content-centric system to facilitate such information exchange such that an AV may be able to generate a navigation video/model/map that may be used to make complex routing and control decisions. Some embodiments may provide the additional advantage of not requiring the exact location of AVs to exchange information. Instead, with the help of transmitting the interest packet using beamforming in the interest area, only the AVs that are likely to have the required field-of-views will receive and therefore respond to the interest packets. For example, an AV in accordance with some embodiments may advertise a request for a desired video segment. The advertised request may be addressed based on the requesting AV's location and orientation. Other AVs that receive the request and have video information matching the request may respond with the requested video segment. Advantageously, using a location and/or content-centric technique may eliminate the need for AVs to address other AVs individually and may instead utilize content and location of interest as the means to solicit/receive video information.

In some embodiments, the camera parameters may be utilized to make or anticipate abandonment of one view for another (e.g., knowing the upcoming information is about to be less useful than other options). For example, the essential parameters exchanged between the vehicles may be accumulated over time. Any suitable parametric filtering technology or machine-learning based prediction technology may be utilized to quantify the usefulness of the field-of-view. Based on the quantified information, the antennas may be configured to direct the future interest packets and/or data packets. Some embodiments may also utilize and/or manipulate antenna parameters from the information layer.

Some embodiments may utilize mobile edge computing technology to implement various aspects of an information-centric architecture. For example, each of the AVs may act as edge nodes themselves accumulating information (e.g., camera parameters, etc.) sufficient to make autonomous decisions and control of the air-interface. The compute and memory availability of the AVs allows this edge behavior with minimal need for supervision/orchestration from remote servers.

A location and content-centric approach may be well suited for applications where the request from a particular edge device is primarily a function of the information needed from a particular location and not a function of what edge device might be present in that location. For example, some embodiments may utilize a beamforming based approach to transmit interest packets that are only targeted towards sectors from where the information is to be requested. In some embodiments, cross layer communications may be improved or optimized where a physical layer may be controlled by the application layer that only requires information in a certain sector. In some embodiments, beamforming may advantageously act as location-based addressing to relevant AVs of interest.

Location and Content-Centric Network Architecture and Protocol Examples

In some embodiments, a requesting AV may obtain 3D video information from neighboring AVs and then create a 3D video navigation model at the requesting AV with mutual information obtained with the help of a location/content-centric network architecture. Advantageously, some embodiments of a location/content-centric network architecture may make efficient use of compute and network bandwidth. For a 3D video navigation model in consideration, for example, the requesting AV may readily determine what information may be generated locally and may primarily only need to obtain video information from neighboring/nearby AVs in order to stitch together a more comprehensive 3D video model for navigation. The requesting AV does not need to individually identify the other AVs or even need to identify who is the actual originator of the video information being transmitted. Some embodiments may provide an efficient technique to construct the 3D navigation model by having the requesting AV publish its own interest in the form of an interest packet to the area from which it desires the video information. If another AV is in that location area and possesses the video data satisfying the parameters indicated by the requesting AV in the interest packet, the receiving AV may propagate the video information data response packet within the requested location. The receiving AV may also indicate the content, which may be used together with the transmission location to find the requester AV. In some embodiments, a time limit may be placed on the interest packet as well as the data response packet.

Some embodiments may provide an architecture based on location and/or content-centric techniques which may be well suited to be deployed as an edge application. For example, embodiments of any/each of the AVs may be considered as an edge device which may be considered as either a content/sensor server, a content/sensor consumer, or both. For example, the AV may include an on-board vehicle computer which may include logic or instructions which when executed cause the vehicle computer to implement one or more aspects of the embodiments described herein. Some embodiments may generate a local 3D video for a vehicle through content-addressed message exchanges between vehicles and distributed computational overhead.

In any given traffic situation, the AVs may be moving along with other AVs with relatively small velocity differences. A requesting AV may already know which field-of-view video segments they would benefit from in order to form a fuller 3D navigation video/model/map (e.g., based on a detected obstruction, the requesting AV's camera parameters, etc.). In some embodiments, one example of how to represent the interest of the AV is to apply a sector of a certain angle with the requesting AV in the center and the video content information (e.g., field-of-view, direction, resolution, etc.). The requested information may be grouped as a tuple <angle X, content Y> (e.g., the tuple may additionally have as many elements as needed for a particular system architecture, resolution, etc.). The requesting AV may then transmit an interest packet using transmission beamforming with an angle X and a packet indicating content Y as the requested information. Advantageously, only the AVs that fall in the beamformed region may receive the interest packet and may further use the content Y information to identify the interest packet. The received information may be sufficient for the receiving AV to determine if they have the video segment requested by the requesting AV. The receiving AV may either relay the request to other AVs or may reply with its own beamformed data response packet in the region for the requesting AV to receive. The beamforming direction may be chosen based on the requesting and/or receiving vehicle location(s), and may be further enhanced by knowledge of other vehicle locations which may be obtained through message exchanges as part of DSRC or some other protocol.

Interest Packet Example

The requesting AV may contain its own 3D video data segments. In addition, the requesting AV may identify additional video segments desired to form a fuller or an entire 3D video navigation model. The requesting AV may use transmit beamforming to send an interest packet to a targeted location of interest using the parameters <angle, content> (e.g., location-based addressing). To help the receiving AVs to identify the requested data, a content name may be provided in an interest packet (e.g., content-based addressing).

Figure 4:
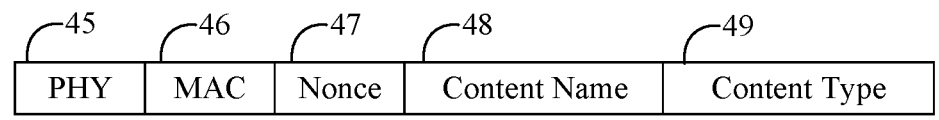
FIG. 4 is an illustrative diagram of an example of an interest packet format according to an embodiment.

Turning now to FIG. 4, an embodiment of an interest packet 44 may have any suitable wireless communication format and may include fields corresponding to physical layer information (PHY) 45, media access control (MAC) information 46, nonce information 47, content name information 48, and/or content type information 49 including requester parameter (RP) information. For example, the content name information 48 may uniquely identify that the interest packet may be for a video segment request. The content type information 49 may indicate RP information that may need to be matched for the requested video. The requester parameter information may include camera orientation, position, minimum supported resolution, frame rate, etc. The MAC 46 and PHY 45 information may correspond to any suitable wireless radio access technology that may support transmit beamforming and may be configurable through a higher layer operation.

Data Response Packet Examples

A receiving AV may check the content name and the content type and determine if they have the requested information (e.g., a video segment) available. If not, the receiving AV may relay the received interest packet using the same identifier tuple <angle, content>. If so, the receiving AV may send a data response packet.

Figure 5:
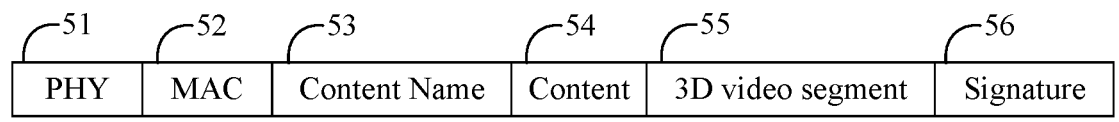
FIG. 5 is an illustrative diagram of an example of a data response packet format according to an embodiment.

Turning now to FIG. 5, an embodiment of a data response packet 50 may have any suitable wireless communication format and may include fields corresponding to PHY information 51, MAC information 52, content name information 53, content information 54, 3D video segment information 55, and/or signature information 56. Any AVs that match the identifier in the interest packet may reply with a data response packet. The data response packets may be beamformed based on the angle parameter from the interest packet (e.g., location based addressing) and may include the responsive content information (e.g., content-based addressing). The 3D video segment information 55 may include the payload for the data response packet 50.

In some embodiments, the receiving AVs may send correlated data response packets upon receiving the interest packet. For example, a receiving AV that receives multiple request packets with the same angle parameter but different content information in the identifier tuple may determine that their separate data response packet transmissions may be correlated. In some embodiments, the receiving AV may identify the difference between the video segments and only send the uncorrelated data response packets back. Additionally, or alternatively, some embodiments may provide an additional benefit of reducing duplicate data response packet transmissions. For example, an intermediate AV that relays an interest packet may also store the interest packet information in an interest list. Once the interest lifetime is ended or if a data response packet has already been forwarded to the requester in response to an interest packet from the interest list, the intermediate AV may remove the interest packet from its interest list. Upon receiving a duplicate data response packet, the intermediate AV advantageously may not forward the duplicate packet to the requesting AV.

A receiving AV may not immediately possess the video data requested in an interest packet. In this case, the receiving AV may act as an intermediate AV and buffer the interest packet for the lifetime of the packet and may also relay the interest packet within the lifetime within the interest area. If a third AV has the requested data, the third AV may reply with its data response packet in the interest area. The requester AV may directly receive the data response packet. Alternatively, the data response packet may reach an intermediate AV that has buffered the interest packet. If the intermediate AV receives the data response packet and relays the packet in the network, the intermediate AV may then clear the buffered interest packet. If no data response packet is received by the intermediate AV before the interest packet expires, the buffered packet may be discarded. The intermediate AV may also periodically check the buffered interest packets to determine if the intermediate AV possesses the requested information at some time after the interest packet was received but before the interest packet expires. The process may continue until the requesting AV receives the data response packet within the lifetime indicated in the interest packet. For example, the time limit may be relatively short for interest packets in the immediately surrounding area (e.g., 100 ms), and longer for further out information (e.g., 1-3 seconds).

Network Operation Example

Figure 6A:
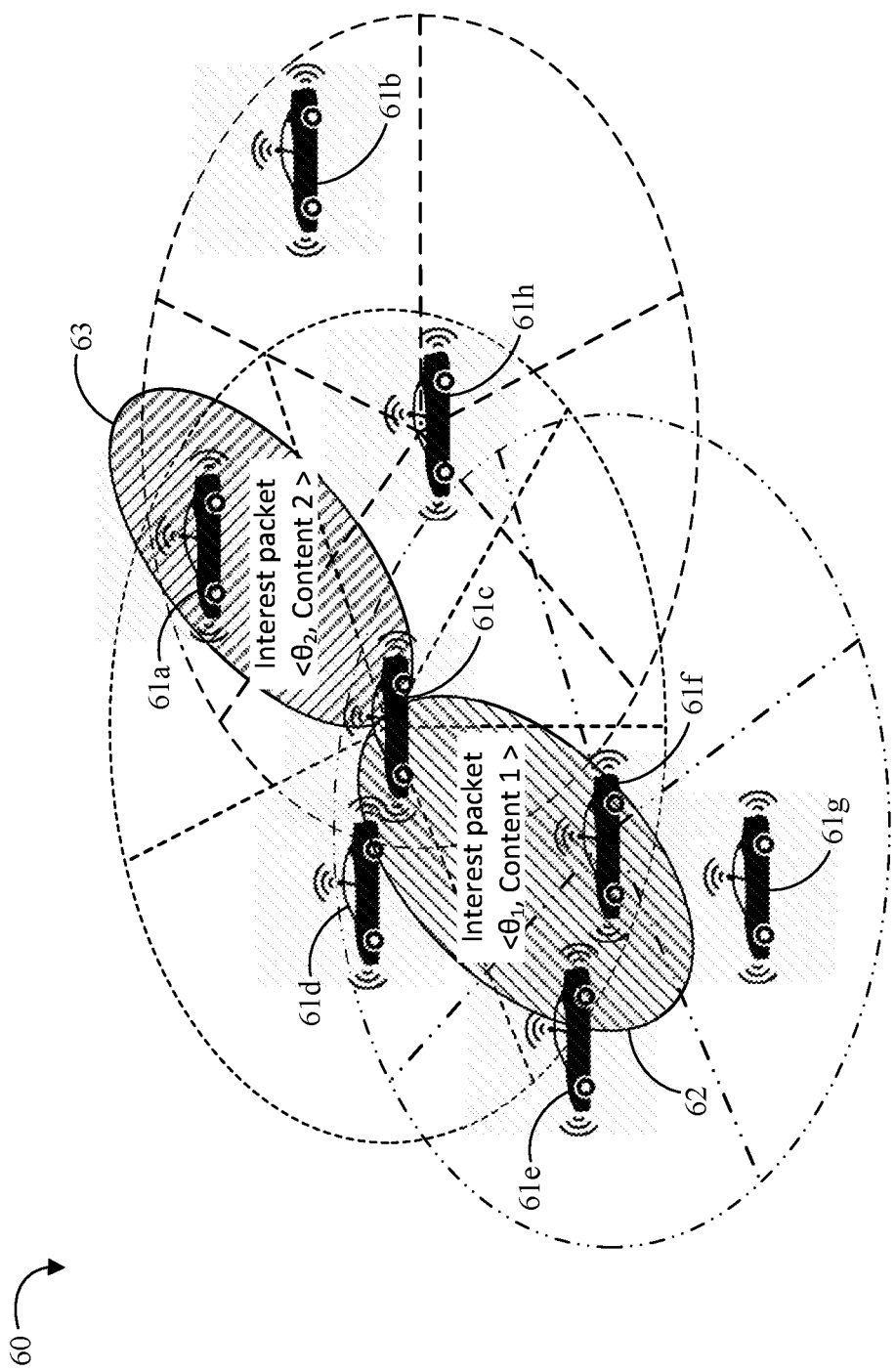
FIGS. 6A and 6B are illustrative diagrams of an example of an environment for distribution of 3D video information for navigation according to an embodiment.
Figure 6B:
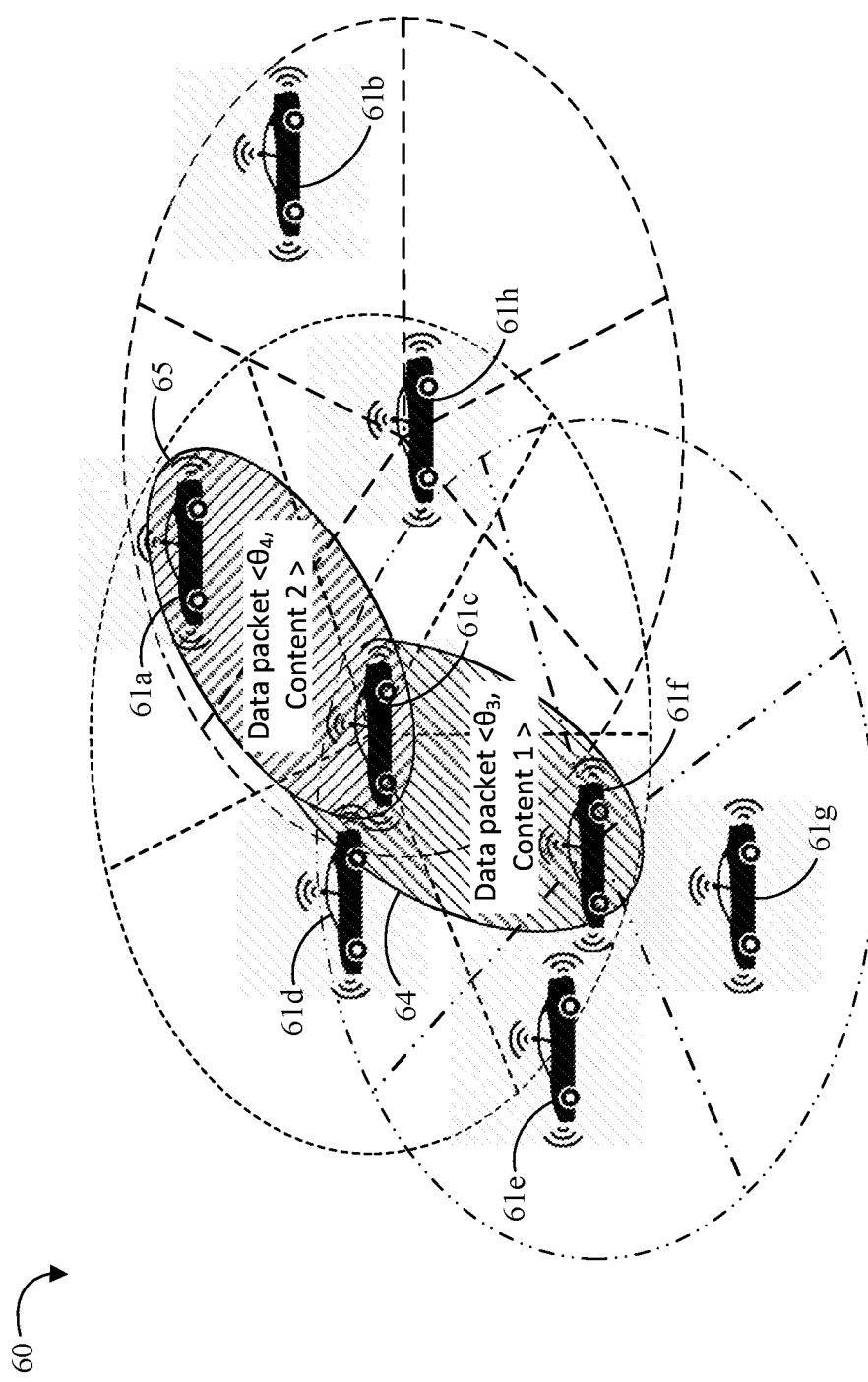

Turning now to FIGS. 6A and 6B, an environment 60 for distribution of 3D video information for navigation may include multiple vehicles 61 (e.g., vehicle 61a through 61h), some of which may be AVs. Some of the vehicles 61 may include on-board vehicle computers and wireless radios for communications with one or more of the other vehicles. The radios may have illustrative ranges indicated by the dashed/dotted lines. An embodiment of the vehicle 61c may determine gaps in its navigation information as tuples of <$\theta_1$, Content 1> and <$\theta_2$, Content 2>. The vehicle 61c may format a first interest packet for Content 1 and may beamform transmit the first interest packet in an area 62 at the angle $\theta_1$. The vehicle 61c may also format a second interest packet for Content 2 and may beamform transmit the second interest packet in an area 63 around the angle $\theta_2$. The vehicle 61f may receive the first interest packet and may analyze the content information from the first interest packet to determine that it has information which is responsive to the request. The vehicle 61f may then format a first data response packet which includes a Content 1 identifier together with the response information and may beamform transmit the first data response packet in an area 64 at an angle $\theta_3$ based on the angle $\theta_1$ of the received first interest packet. The vehicle 61a may receive the second interest packet and may analyze the content information from the second interest packet to determine that it has information which is responsive to the request. The vehicle 61a may then format a second data response packet which includes a Content 2 identifier together with the response information and may beamform transmit the second data response packet in an area 65 at an angle $\theta_4$ based on the angle $\theta_2$ of the received second interest packet. The vehicle 61c may then utilize the response information (e.g., which may include 3D video information) to construct a more comprehensive 3D model for navigation of the vehicle 61c.

Advantageously, some embodiments may provide a network for collaborative 3D video navigation models constructed from multiple vehicles. Some embodiments of a content-centric technique for constructing 3D video navigation models may be independent of the underlying layer 2 and layer 1 protocol. For example, the AVs may utilize 802.11p for the underlying V2V communications or 5G V2V layer 1 and layer 2 protocols. In some embodiments, the content-centric architecture may lie in layer 3 and layer 4 and allow the AVs to act as edge nodes in the network. For example, some embodiments of a suitably equipped AV may include a V2V radio such as an 802.11p or 5G radio, and may also include cameras that may capture video feeds. The cameras may be calibrated so that their intrinsic parameters are known. In some embodiments, the AV may be considered as a data-center on wheels and may be able to perform computational tasks such as video processing, stitching, etc. Some embodiments of an AV may contain sufficient buffer memory to store its own video capture information as well as the received video data from nearby data sources that may be relayed to the requesting AVs. Some embodiments of an AV may also be cloud-enabled to obtain useful navigational or other information from cloud services to construct the AV's navigational model.

Some embodiments may generate 3D video collaboratively with AVs and their cameras for navigation and perception as part of edge computing framework. For example, some embodiments may use content-addressable techniques to communicate partial video information for building a 3D navigation and perception video model. Some embodiments may also use location-addressable techniques such as beamforming technology for addressing AVs, from which relevant video may be obtained for the 3D video navigation model. Some embodiments may include technology for sending interest packets from AVs requesting video data in the form of content-centric/content-addressable networks. Some embodiments may include technology for buffering interest packet requests, and technology for sending video data response packet from AVs using content-centric/content-addressable networks. Some embodiments may exchange camera parameters and may use the parameters for content-based addressing between AVs. Some embodiments may add nonce to the interest packet along with the content name to detect looping interest packets. Some embodiments may add a signature to the video data transmitted in response to the interest packet.

Figure 7:
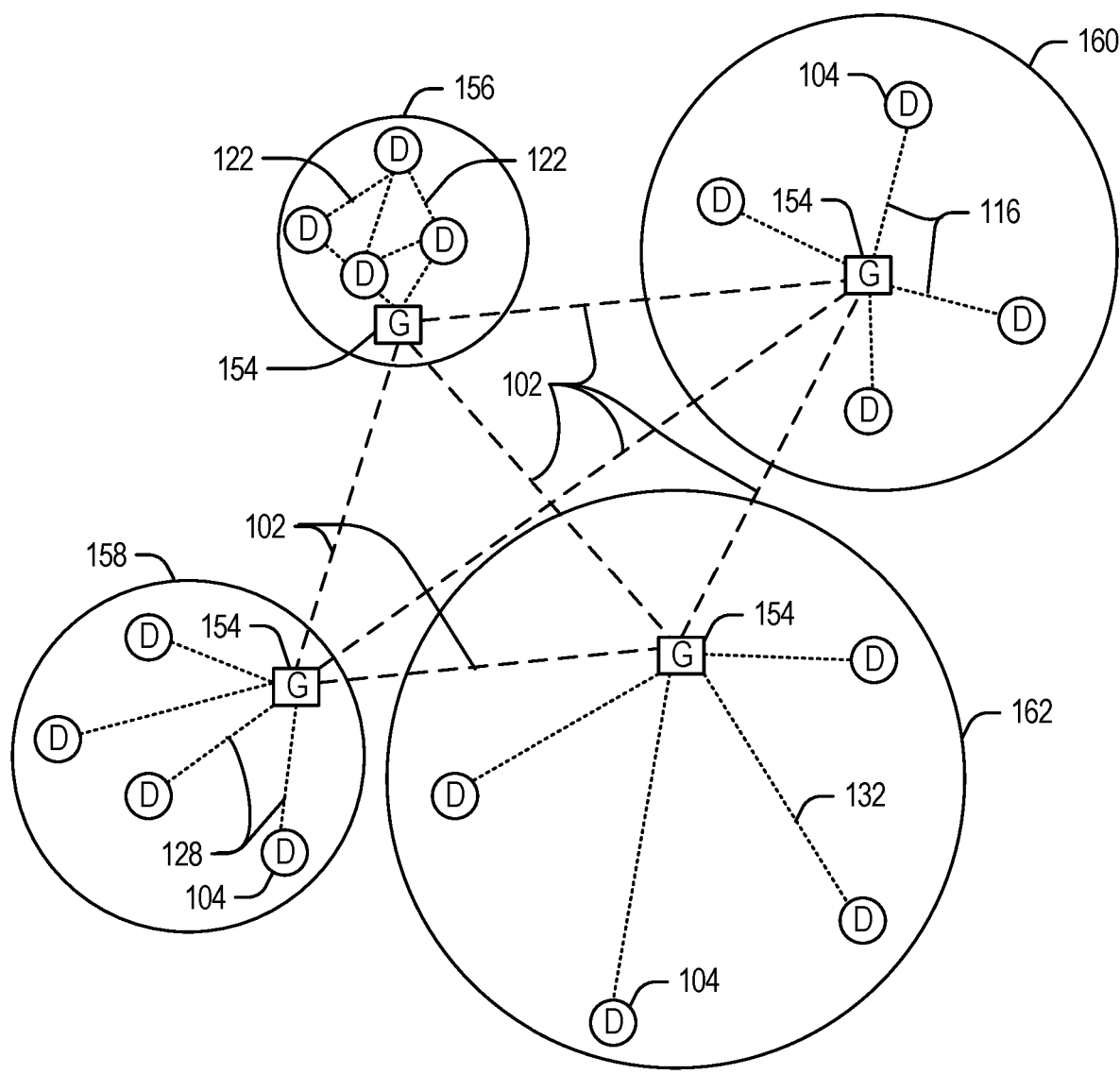
FIG. 7 illustrates a domain topology for respective internet-of-things (IoT) networks coupled through links to respective gateways, according to an example.

FIG. 7 illustrates an example domain topology for respective internet-of-things (IoT) networks coupled through links to respective gateways. For example, the domain topology of FIG. 7 may be representative of one type of network that may be used to provision and/or provide supporting information to the various embodiments described herein. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 8:
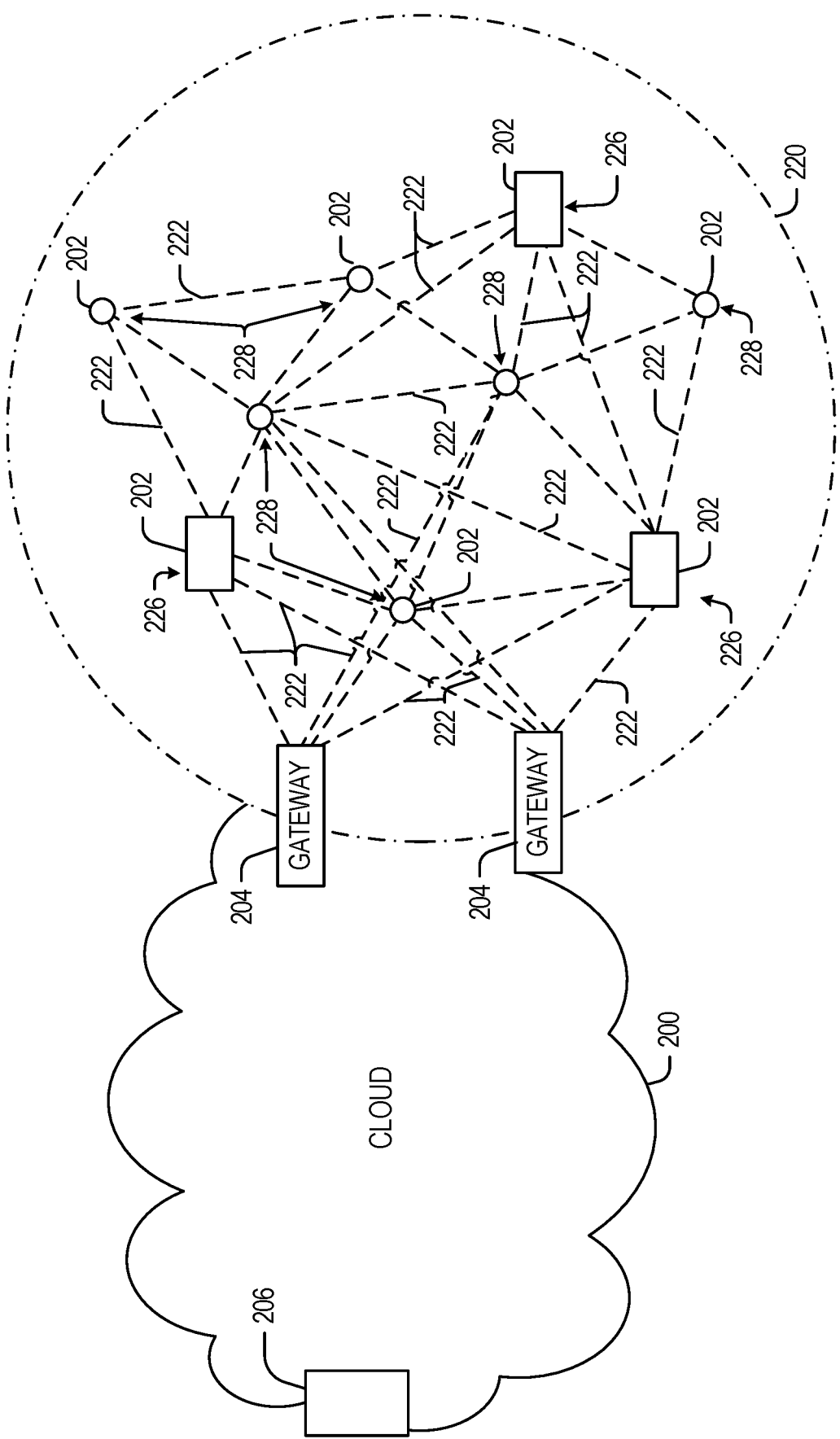
FIG. 8 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7 and 8, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 9 and 10.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 8 below.

FIG. 8 illustrates a cloud computing network in communication with a mesh network of IoT devices (devices 202) operating as a fog device at the edge of the cloud computing network. For example, the cloud/edge computing network of FIG. 8 may be representative of one type of network that may be used to provision and/or provide supporting information to the various embodiments described herein. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above with reference to FIGS. 1 to 6B may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 9:
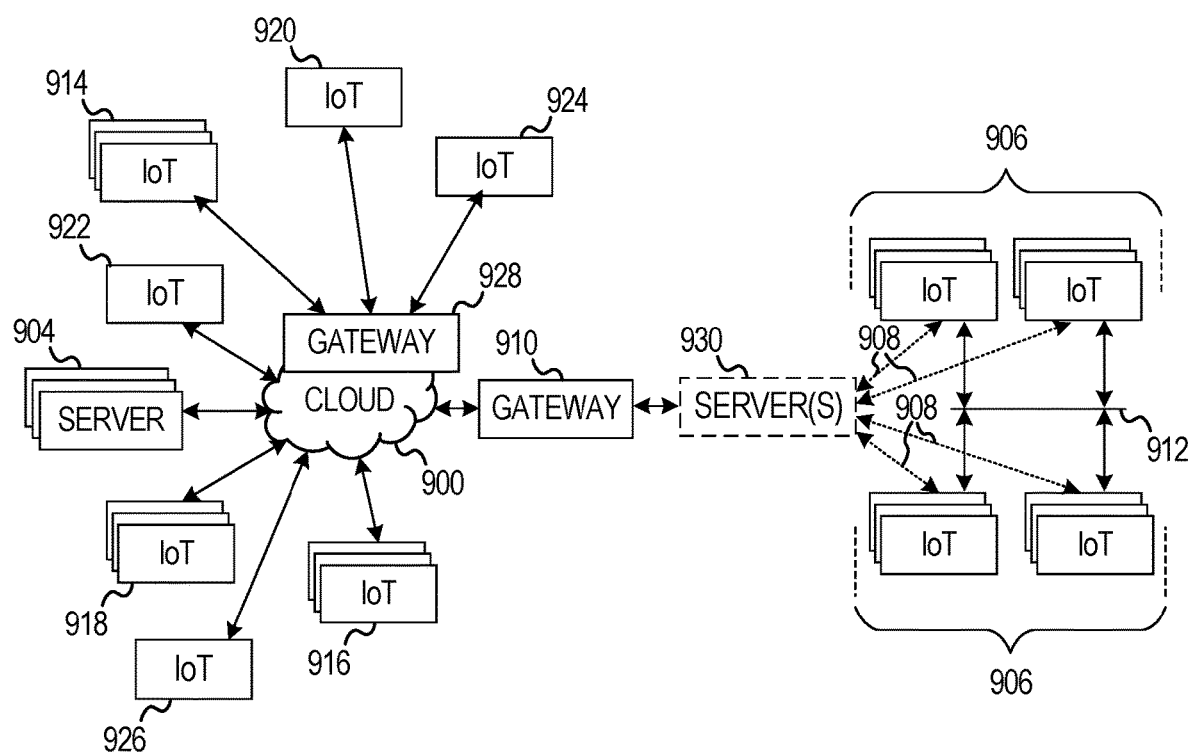
FIG. 9 illustrates a block diagram of a network illustrating communications among a number of IoT devices, according to an example.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. For example, the cloud/IoT computing network of FIG. 9 may be representative of one type of network that may be used to provision and/or provide supporting information to the various embodiments described herein. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 8), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8).

Figure 10:
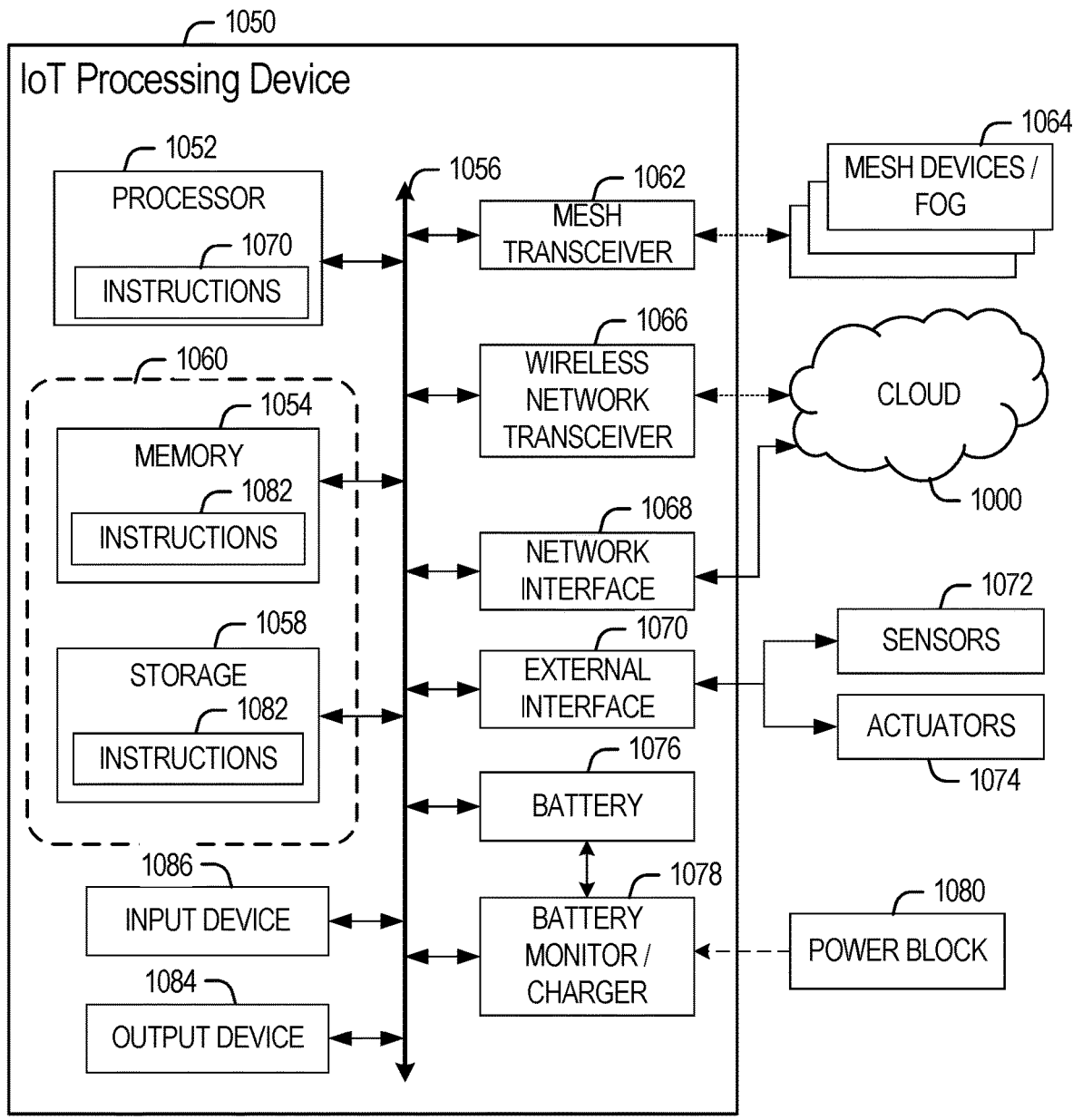
FIG. 10 illustrates a block diagram for an example IoT processing system architecture upon which any one or more of the techniques (e.g., operations, processes, methods, and methodologies) discussed herein may be performed, according to an example.

FIG. 10 is a block diagram of an example of components that may be present in an IoT device 1050 for implementing the techniques described herein. For example, the components of the IoT device 1050 and other components of FIG. 10 may be representative of the types of components that may be found in autonomous vehicles and/or distributed 3D video systems according to the various embodiments described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™ an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, etc. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depends on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

ADDITIONAL NOTES AND EXAMPLES

Example 1 may include an electronic processing system, comprising a processor, memory communicatively coupled to the processor, a radio communicatively coupled to the processor, and logic communicatively coupled to the processor and the radio to request video information from a source outside of a vehicle, receive the video information in response to the request, and construct three-dimensional video information for the vehicle based on the received video information.

Example 2 may include the system of Example 1, wherein the logic is further to send an interest packet to one or more other vehicles to indicate an interest in video information from the one or more other vehicles.

Example 3 may include the system of Example 2, wherein the logic is further to beamform a message to direct the interest packet to the one or more other vehicles.

Example 4 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to request video information from a source outside of a vehicle, receive the video information in response to the request, and construct three-dimensional video information for the vehicle based on the received video information.

Example 5 may include the apparatus of Example 4, wherein the logic is further to send an interest packet to one or more other vehicles to indicate an interest in video information from the one or more other vehicles.

Example 6 may include the apparatus of Example 5, wherein the logic is further to communicate partial video information between the vehicle and the one or more other vehicles with a content-addressable message.

Example 7 may include the apparatus of Example 5, wherein the logic is further to beamform a message to direct the interest packet to the one or more other vehicles.

Example 8 may include the apparatus of Example 5, wherein the logic is further to buffer interest packet requests, and send a video data response packet over a content-centric and content-addressable network.

Example 9 may include the apparatus of Example 8, wherein the logic is further to exchange camera parameter information between the vehicle and the one or more other vehicles, and perform content-based addressing based on the exchanged camera parameters.

Example 10 may include the apparatus of Example 8, wherein the logic is further to add signature information to the video data response packet.

Example 11 may include the apparatus of any of Examples 5 to 10, wherein the logic is further to add nonce information to the interest packet.

Example 12 may include a method of distributing video information, comprising requesting video information from a source outside of a vehicle, receiving the video information in response to the request, and constructing three-dimensional video information for the vehicle based on the received video information.

Example 13 may include the method of Example 12, further comprising sending an interest packet to one or more other vehicles to indicate an interest in video information from the one or more other vehicles.

Example 14 may include the method of Example 13, further comprising communicating partial video information between the vehicle and the one or more other vehicles with a content-addressable message.

Example 15 may include the method of Example 13, further comprising beamforming a message to direct the interest packet to the one or more other vehicles.

Example 16 may include the method of Example 13, further comprising buffering interest packet requests, and sending a video data response packet over a content-centric and content-addressable network.

Example 17 may include the method of Example 16, further comprising exchanging camera parameter information between the vehicle and the one or more other vehicles, and performing content-based addressing based on the exchanged camera parameters.

Example 18 may include the method of Example 16, further comprising adding signature information to the video data response packet.

Example 19 may include the method of any of Examples 13 to 18, further comprising adding nonce information to the interest packet.

Example 20 may include at least one computer readable medium, comprising a set of instructions, which when executed by a computing device, cause the computing device to request video information from a source outside of a vehicle, receive the video information in response to the request, and construct three-dimensional video information for the vehicle based on the received video information.

Example 21 may include the at least one computer readable medium of Example 20, comprising a further set of instructions, which when executed by the computing device, cause the computing device to send an interest packet to one or more other vehicles to indicate an interest in video information from the one or more other vehicles.

Example 22 may include the at least one computer readable medium of Example 21, comprising a further set of instructions, which when executed by the computing device, cause the computing device to communicate partial video information between the vehicle and the one or more other vehicles with a content-addressable message.

Example 23 may include the at least one computer readable medium of Example 21, comprising a further set of instructions, which when executed by the computing device, cause the computing device to beamform a message to direct the interest packet to the one or more other vehicles.

Example 24 may include the at least one computer readable medium of Example 21, comprising a further set of instructions, which when executed by the computing device, cause the computing device to buffer interest packet requests, and send a video data response packet over a content-centric and content-addressable network.

Example 25 may include the at least one computer readable medium of Example 24, comprising a further set of instructions, which when executed by the computing device, cause the computing device to exchange camera parameter information between the vehicle and the one or more other vehicles, and perform content-based addressing based on the exchanged camera parameters.

Example 26 may include the at least one computer readable medium of Example 24, comprising a further set of instructions, which when executed by the computing device, cause the computing device to add signature information to the video data response packet.

Example 27 may include the at least one computer readable medium of any of Examples 21 to 26, comprising a further set of instructions, which when executed by the computing device, cause the computing device to add nonce information to the interest packet.

Example 28 may include a navigator apparatus, comprising means for requesting video information from a source outside of a vehicle, means for receiving the video information in response to the request, and means for constructing three-dimensional video information for the vehicle based on the received video information.

Example 29 may include the apparatus of Example 28, further comprising means for sending an interest packet to one or more other vehicles to indicate an interest in video information from the one or more other vehicles.

Example 30 may include the apparatus of Example 29, further comprising means for communicating partial video information between the vehicle and the one or more other vehicles with a content-addressable message.

Example 31 may include the apparatus of Example 29, further comprising means for beamforming a message to direct the interest packet to the one or more other vehicles.

Example 32 may include the apparatus of Example 29, further comprising means for buffering interest packet requests, and means for sending a video data response packet over a content-centric and content-addressable network.

Example 33 may include the apparatus of Example 32, further comprising means for exchanging camera parameter information between the vehicle and the one or more other vehicles, and means for performing content-based addressing based on the exchanged camera parameters.

Example 34 may include the apparatus of Example 32, further comprising means for adding signature information to the video data response packet.

Example 35 may include the apparatus of any of Examples 29 to 34, further comprising means for adding nonce information to the interest packet.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor;

a radio communicatively coupled to the processor; and
logic communicatively coupled to the processor and the radio to:
  capture a first video information with a first field of view from a vehicle,
  determine two or more gaps in navigational information,
  request a second video information from a distributed video source outside of the vehicle, wherein the request of the second video information comprises beamforming a first interest packet within a first interest area for a first content and beamforming a second interest packet within a second interest area for a second content in response to the determined two or more gaps in navigational information, wherein the distributed video source comprises a first group of vehicles located within the first interest area and a second group of vehicles located within the second interest area, wherein the second interest packet is different from the first interest packet, the second interest area is different from the first interest area, and the second content is different from the first content, and wherein the first interest packet is dedicated to the first group of vehicles located within the first interest area and the second interest packet is dedicated to the second group of vehicles located within the second interest area,
  receive the second video information in response to the request,
  construct three-dimensional video information for the vehicle based on the first video information with the first field of view and based on the received second video information with a different second field of view, and
  detect one or more obstacles based on the constructed three-dimensional video information for the vehicle.

2. The system of claim 1, wherein the logic is further to:
communicate partial video information between the vehicle and the one or more other vehicles with a content-addressable message.

3. The system of claim 1, wherein the logic is further to:
buffer interest packet requests; and
send a video data response packet over a content-centric and content-addressable network.

4. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
  capture first video information with a first field of view from a vehicle,
  determine two or more gaps in navigational information,
  request second video information from a distributed video source outside of the vehicle, wherein the request of the second video information comprises beamforming a first interest packet within a first interest area for a first content and beamforming a second interest packet within a second interest area for a second content in response to the determined two or more gaps in navigational information, wherein the distributed video source comprises a first group of vehicles located within the first interest area and a second group of vehicles located within the second interest area, wherein the second interest packet is different from the first interest packet, the second interest area is different from the first interest area, and the second content is different from the first content, and wherein the first interest packet is dedicated to the first group of vehicles located within the first interest area and the second interest packet is dedicated to the second group of vehicles located within the second interest area,
  receive the second video information in response to the request,
  construct three-dimensional video information for the vehicle based on the first video information with the first field of view and based on the received second video information with a different second field of view, and
  detect one or more obstacles based on the constructed three-dimensional video information for the vehicle.

5. The apparatus of claim 4, wherein the logic is further to:
communicate partial video information between the vehicle and the one or more other vehicles with a content-addressable message.

6. The apparatus of claim 4, wherein the logic is further to:
buffer interest packet requests; and
send a video data response packet over a content-centric and content-addressable network.

7. The apparatus of claim 6, wherein the logic is further to:
exchange camera parameter information between the vehicle and the one or more other vehicles; and
perform content-based addressing based on the exchanged camera parameters.

8. The apparatus of claim 6, wherein the logic is further to:
add signature information to the video data response packet.

9. The apparatus of claim 4, wherein the logic is further to:
add nonce information to the interest packet.

10. A method of distributing video information, comprising:
capturing first video information with a first field of view from a vehicle;
determining two or more gaps in navigational information;
requesting second video information from a distributed video source outside of the vehicle, wherein the request of the second video information comprises beamforming a second interest packet within a second interest area for a second content in response to the determined two or more gaps in navigational information, wherein the distributed video source comprises a first group of vehicles located within the first interest area and a second group of vehicles located within the second interest area, wherein the second interest packet is different from the first interest packet, the second interest area is different from the first interest area, and the second content is different from the first content, and wherein the first interest packet is dedicated to the first group of vehicles located within the first interest area and the second interest packet is dedicated to the second group of vehicles located within the second interest area;
receiving the second video information in response to the request;
constructing three-dimensional video information for the vehicle based on the first video information with the first field of view and based on the received second video information with a different second field of view; and detecting one or more obstacles based on the constructed three-dimensional video information for the vehicle.

11. The method of claim 1, further comprising:

communicating partial video information between the vehicle and the one or more other vehicles with a content-addressable message.

12. The method of claim 10, further comprising:

buffering interest packet requests; and sending a video data response packet over a content-centric and content-addressable network.

13. The method of claim 12, further comprising:

exchanging camera parameter information between the vehicle and the one or more other vehicles; and performing content-based addressing based on the exchanged camera parameters.

14. The method of claim 12, further comprising:

adding signature information to the video data response packet.

15. The method of claim 10, further comprising:

adding nonce information to the interest packet.

16. At least one computer readable medium, comprising a set of instructions, which when executed by a computing device, cause the computing device to:

capture first video information with a first field of view from a vehicle;

determine two or more gaps in navigational information;

request second video information from a distributed video source outside of the vehicle, wherein the request of the second video information comprises beamforming a second interest packet within a second interest area for a second content in response to the determined two or more gaps in navigational information, wherein the distributed video source comprises a first group of vehicles located within the first interest area and a second group of vehicles located within the second interest area, wherein the second interest packet is different from the first interest packet, the second interest area is different from the first interest area, and the second content is different from the first content, and wherein the first interest packet is dedicated to the first group of vehicles located within the first interest area and the second interest packet is dedicated to the second group of vehicles located within the second interest area;

receive the second video information in response to the request;

construct three-dimensional video information for the vehicle based on the first video information with the first field of view and based on the received second video information with a different second field of view; and detect one or more obstacles based on the constructed three-dimensional video information for the vehicle.

17. The at least one non-transitory computer readable medium of claim 16, comprising a further set of instructions, which when executed by the computing device, cause the computing device to:

communicate partial video information between the vehicle and the one or more other vehicles with a content-addressable message.

18. The at least one non-transitory computer readable medium of claim 16, comprising a further set of instructions, which when executed by the computing device, cause the computing device to:

buffer interest packet requests; and send a video data response packet over a content-centric and content-addressable network.

19. The at least one non-transitory computer readable medium of claim 18, comprising a further set of instructions, which when executed by the computing device, cause the computing device to:

exchange camera parameter information between the vehicle and the one or more other vehicles; and perform content-based addressing based on the exchanged camera parameters.

20. The apparatus of claim 4, wherein at least one vehicle is common to both the first group of vehicles and the second group of vehicles.

21. The apparatus of claim 4, wherein the first field of view is associated with the first interest area and the different second field of view is associated with the second interest area.

22. The apparatus of claim 4, wherein at least one vehicle has a first camera associated with the first field of view and a second camera associated with the different second field of view.

23. The apparatus of claim 4, wherein the logic is further to: receive a signature to indicate whether the second video information is from the first interest area or the second interest area for construction of the three-dimensional video information.

* * * * *